US008940427B2

(12) United States Patent
Noda et al.

(10) Patent No.: US 8,940,427 B2
(45) Date of Patent: Jan. 27, 2015

(54) RECHARGEABLE BATTERY PACK

(75) Inventors: Masafumi Noda, Anjo (JP); Hitoshi Suzuki, Anjo (JP); Hisakazu Okabayashi, Anjo (JP)

(73) Assignee: Makita Corporation, Anjo-shi (JP)

( * ) Notice: Subject to any disclaimer, the term of this patent is extended or adjusted under 35 U.S.C. 154(b) by 486 days.

(21) Appl. No.: 13/277,469

(22) Filed: Oct. 20, 2011

(65) Prior Publication Data

US 2012/0100405 A1 Apr. 26, 2012

(30) Foreign Application Priority Data

Oct. 26, 2010 (JP) ................. 2010-240043

(51) Int. Cl.
| | |
|---|---|
| *H01M 10/38* | (2006.01) |
| *H01M 10/48* | (2006.01) |
| *H01M 2/10* | (2006.01) |
| *H01M 10/42* | (2006.01) |

(52) U.S. Cl.
CPC ........ *H01M 10/488* (2013.01); *H01M 10/4207* (2013.01); *H01M 10/4257* (2013.01); *H01M 2/1055* (2013.01)
USPC ................ 429/123; 429/90; 429/91; 429/100

(58) Field of Classification Search
USPC ................. 429/100, 123, 90, 91; 320/134
See application file for complete search history.

(56) References Cited

U.S. PATENT DOCUMENTS

| | | | | |
|---|---|---|---|---|
| 6,201,370 | B1 * | 3/2001 | Reller et al. ................... | 320/107 |
| 7,639,019 | B2 * | 12/2009 | Bosse et al. ................... | 324/426 |
| 2004/0239293 | A1 | 12/2004 | Mori et al. | |
| 2004/0263119 | A1 | 12/2004 | Meyer et al. | |

(Continued)

FOREIGN PATENT DOCUMENTS

| | | |
|---|---|---|
| JP | A-H037025 | 1/1991 |
| JP | A-7-161340 | 6/1995 |
| JP | A-7-282858 | 10/1995 |

(Continued)

OTHER PUBLICATIONS

European Search Report dated Feb. 2, 2012 issued in European Patent Application No. 11186366.8.

(Continued)

*Primary Examiner* — Patrick Ryan
*Assistant Examiner* — Julian Anthony
(74) *Attorney, Agent, or Firm* — Oliff PLC

(57) ABSTRACT

A rechargeable battery pack attachable to a power tool includes a display element, a remaining capacity detection device, a remaining capacity display control device, an abnormality detection device, and an abnormality display control device. The display element is provided such that a lighted state thereof can be confirmed from outside. The remaining capacity detection device detects a remaining capacity of a rechargeable battery. The remaining capacity display control device displays the remaining capacity detected by the remaining capacity detection device by controlling the lighted state of the display element. The abnormality detection device detects an abnormality of the rechargeable battery. The abnormality display control device displays the abnormality of the rechargeable battery detected by the abnormality detection device by controlling the lighted state of the display element to an abnormality display state, which is different from a remaining capacity display state controlled by the remaining capacity display control device.

8 Claims, 5 Drawing Sheets

(56) References Cited

U.S. PATENT DOCUMENTS

| | | |
|---|---|---|
| 2005/0007068 A1 | 1/2005 | Johnson et al. |
| 2009/0289805 A1 | 11/2009 | Patrick et al. |

FOREIGN PATENT DOCUMENTS

| | | |
|---|---|---|
| JP | A-2002-210678 | 7/2002 |
| JP | A-2004-312789 | 11/2004 |
| JP | A-2008-306782 | 12/2008 |
| JP | A-2010-228040 | 10/2010 |

OTHER PUBLICATIONS

May 12, 2014 Office Action issued in European Patent Application No. 11186366.8.

Feb. 25, 2014 Notice of Reasons for Rejection issued in Japanese Patent Application No. 2010-240043 (with translation).

Jul. 22, 2014 Office Action issued in Japanese Patent Application No. 2010-240043 (with English Translation).

* cited by examiner

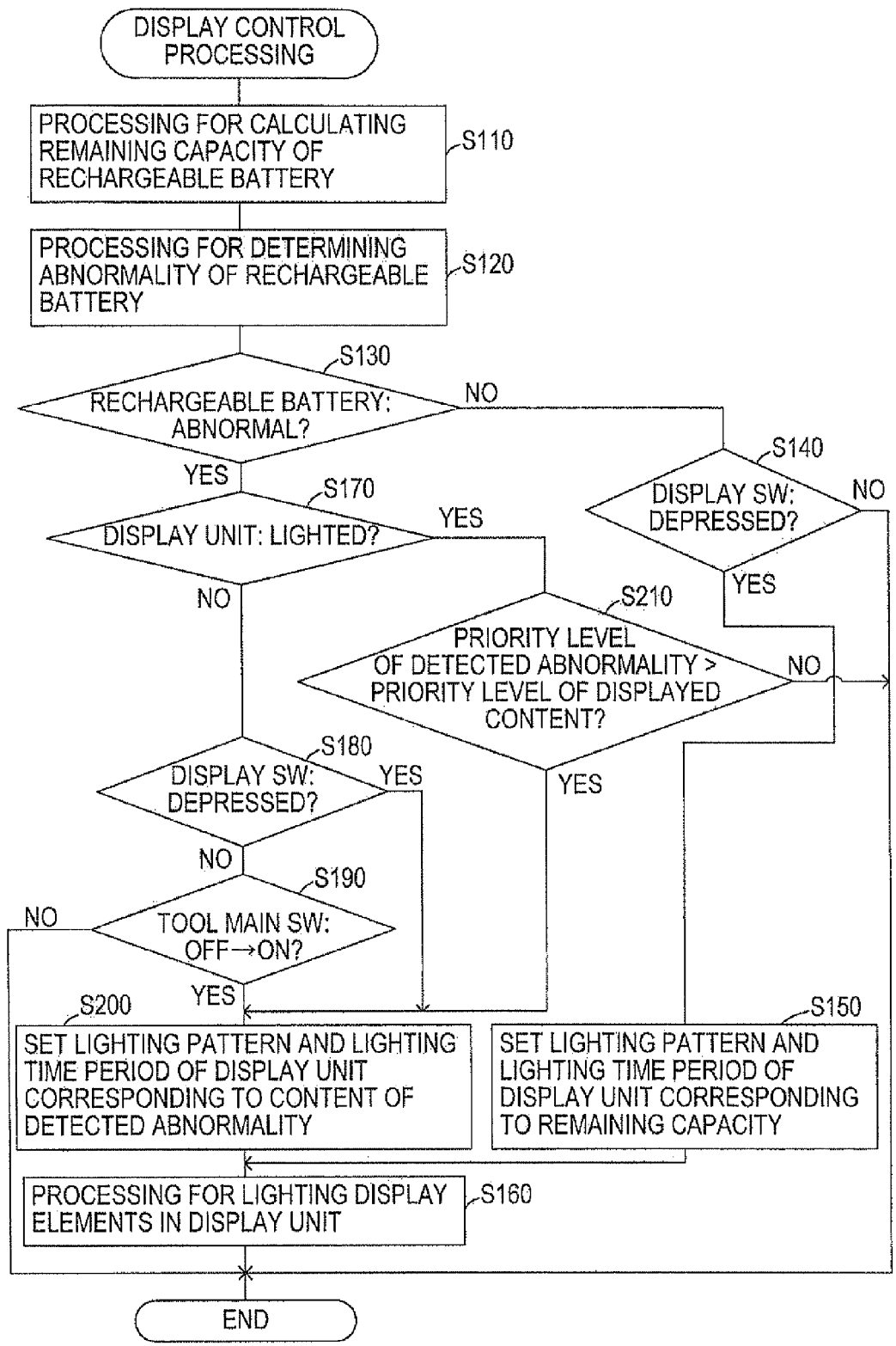

FIG.5

ABNORMALITY DISPLAY

| ABNORMALITY DETERMINATION | DISPLAY PRIORITY LEVEL | LIGHTING PATTERN OF DISPLAY ELEMENTS |
|---|---|---|
| LOCK CURRENT DETERMINATION | 1 | QUICK BLINKING OF TWO ELEMENTS |
| OVERDISCHARGE DETERMINATION | 2 | SLOW BLINKING OF ONE ELEMENT |
| OVERLOAD DETERMINATION | 2 | SLOW BLINKING OF ONE ELEMENT |
| HIGH-TEMPERATURE DETERMINATION | 2 | SLOW BLINKING OF THREE ELEMENTS |
| FAILURE DETERMINATION | 3 | SLOW BLINKING OF FOUR ELEMENTS |

REMAINING CAPACITY DISPLAY

| REMAINING CAPACITY | LIGHTING PATTERN OF DISPLAY ELEMENTS |
|---|---|
| 75%~100% | FOUR ELEMENTS LIGHTED |
| 50%~75% | THREE ELEMENTS LIGHTED |
| 25%~50% | TWO ELEMENTS LIGHTED |
| 0~25% | ONE ELEMENT LIGHTED |

RECHARGEABLE BATTERY PACK

CROSS-REFERENCE TO RELATED APPLICATIONS

This application claims the benefit of Japanese Patent Application No. 2010-240043 filed Oct. 26, 2010 in the Japan Patent Office, the disclosures of which are incorporated herein by reference.

BACKGROUND

The present invention relates to a rechargeable battery pack attachable to a power tool.

Conventionally, this kind of rechargeable battery pack is known in which a plurality of display elements are arranged on an outer wall thereof and which is configured to display a remaining capacity of a rechargeable battery by controlling the number or the like of lighted display elements (see Japanese Unexamined Patent Application Publications Nos. H07-161340, 2004-312789, for example).

Further known are a power tool to which this kind of rechargeable battery pack is attached and a battery charger that charges the rechargeable battery pack. The power tool and the battery charger are configured to determine whether or not an output voltage from the rechargeable battery, an electric current flowing through the rechargeable battery and the like are normal and to display results of the determinations (see Japanese Unexamined Patent Application Publications Nos. 2002-210678, H07-282858, for example).

SUMMARY

However, the conventional rechargeable battery pack only has a function to display a remaining capacity on a standalone basis and, therefore, a user cannot confirm whether or not the rechargeable battery is normal until the rechargeable battery pack is attached to the power tool or the battery charger.

In other words, in order to confirm whether or not the rechargeable battery is normal, the user has to attach the rechargeable battery pack to the power tool or the battery charger having an abnormality detection function and an abnormality display function as described above. Consequently, such a troublesome operation is a problem for the user.

In order to solve the problem, the rechargeable battery pack itself may be given a function to detect and display an abnormality of the rechargeable battery. To achieve this, however, it is necessary to provide the rechargeable battery pack with a display device for displaying the abnormality. Due to this, another problem arises in which upsizing of the rechargeable battery pack is caused.

Specifically, the rechargeable battery pack for a power tool has to be attached to the power tool in such a manner as not to become an obstacle when the user is operating the power tool and, thus, has to be miniaturized. However, if the rechargeable battery pack is provided with the display device for displaying an abnormality, it becomes impossible to meet such demand for miniaturization.

The present invention was made in view of the above problem, and has an object to provide a rechargeable battery pack for a power tool that can display an abnormality of a rechargeable battery on a standalone basis without causing upsizing of the rechargeable battery pack.

On the rechargeable battery pack of the present invention made to achieve the above object, a display element is provided in such a manner that a lighted state thereof can be confirmed from outside. By a remaining capacity display control device controlling the lighted state of the display element, a remaining capacity detected by a remaining capacity detection device is displayed. Meanwhile, by an abnormality display control device controlling the lighted state of the display element to an abnormality display state, which is different from a remaining capacity display state controlled by the remaining capacity display control device, an abnormality of the rechargeable battery detected by an abnormality detection device is displayed.

In other words, in the rechargeable battery pack of the present invention, a display element conventionally provided on the rechargeable battery pack to display a remaining capacity is also utilized as a display element for displaying an abnormality. Therefore, according to the rechargeable battery pack of the present invention, an abnormality of the rechargeable battery can be displayed without providing a display device exclusively for displaying an abnormality.

Consequently, according to the present invention, it is possible to provide a rechargeable battery pack which can detect an abnormality of the rechargeable battery on a standalone basis without causing upsizing of the rechargeable battery pack. Moreover, the user can detect an abnormality of the rechargeable battery without attaching the rechargeable battery pack to a power tool or a battery charger. As a result, a usability of the rechargeable battery pack can be improved, according to the present invention.

In the present invention, by controlling a display state of the display element provided on the rechargeable battery pack, a remaining capacity and an abnormality of the rechargeable battery are displayed. To display these, the rechargeable battery pack may be provided with a plurality of display elements and the number of the lighted or blinking display elements may be changed as will be described later as an embodiment.

Alternatively, the rechargeable battery pack may be provided with a single display element, for example, which can switch colors thereof when lighted, and the colors or lighted states (lighted/blinking, blinking intervals, and the like) of the display element when lighted may be switched in accordance with a remaining capacity and/or an abnormal state of the rechargeable battery.

In the present invention, since the display element provided on the rechargeable battery pack is used to display both a remaining capacity and an abnormality of the rechargeable battery, a timing of switching them and a timing of displaying either of them have to be set in advance.

Specifically, a display switch for inputting a display command by an external operation may be provided, and the remaining capacity display control device may control a display of a remaining capacity of the rechargeable battery in accordance with the display command from the display switch. Similarly, the abnormality display control device may control a display of an abnormality of the rechargeable battery in accordance with the display command from the display switch.

If the rechargeable battery pack is configured as such, a remaining capacity or an abnormality of the rechargeable battery is displayed by the user's operation of the display switch. As a result, the user can promptly confirm a remaining capacity and an abnormality of the rechargeable battery, which leads to a further improvement in usability of the rechargeable battery pack.

The rechargeable battery pack sometimes falls into an abnormal state in which an output voltage of the rechargeable battery is significantly decreased or a discharge current from the rechargeable battery becomes too large when the rechargeable battery pack attached to a power tool is supplying electric power to a motor or the like, which is a power source of the power tool.

Accordingly, it is preferable that a display of an abnormality of the rechargeable battery pack can be performed not only when a display command is inputted via the display switch but also when the rechargeable battery pack is attached to the power tool to drive the same.

To achieve this, the rechargeable battery pack may be provided with a determination device. The determination device is connected to an operation switch of the power tool when the rechargeable battery pack is attached to the power tool. The determination device determines whether or not the operation switch has been operated. Then, the abnormality display control device may display the abnormality detected by the abnormality detection device even when the determination device determines that the operation switch of the power tool has been operated.

If the rechargeable battery pack is configured as such, when any abnormality occurs in the rechargeable battery at the time of driving the power tool (in other words, at the time of supplying the power source to the power tool), such an occurrence of the abnormality can be promptly displayed to notify the abnormality to the user of the power tool.

In the present invention, either of a remaining capacity and an abnormality is displayed through the use of the display element. However, if it is so configured that the display of either of them is carried out all the time, electric power of the rechargeable battery is to be consumed all the time due to such a display.

Therefore, the remaining capacity display control device may continue a display of a remaining capacity of the rechargeable battery from when the display is started until when a preset time period for displaying a remaining capacity is elapsed, and may terminate the display when the time period is elapsed. Similarly, the abnormality display control device may continue a display of an abnormality of the rechargeable battery from when the display is started until when a preset time period for displaying an abnormality is elapsed, and may terminate the display when the time period is elapsed.

If the rechargeable battery pack is configured as such, it is possible to minimize a time period in which the display element is lighted to display a remaining capacity or an abnormality. As a result, electric energy of the rechargeable battery consumed to control the lighting can be reduced.

In the present invention, the abnormality detection device is configured to detect each of a plurality of kinds of abnormalities occurring in the rechargeable battery. Therefore, the abnormality display control device may display the abnormality of the rechargeable battery in such a manner that a content of the abnormality can be identified by setting a lighting pattern of the display element in accordance with the content of the abnormality detected by the abnormality detection device.

According to such a rechargeable battery pack, when any abnormality occurs in the rechargeable battery, the user can identify the content of the abnormality through the lighting pattern of the display element. Then, the user can take appropriate measures for the identified content of the abnormality.

A content of an abnormality of the rechargeable battery detectable by the abnormality detection device includes a failure of the rechargeable battery itself, a failure of a power tool or a battery charger to which the rechargeable battery pack is attached, and the like. Aside from such a content of an abnormality that requires a fair amount of time to be restored to a normal state, there is a content of an abnormality that can be promptly restored to a normal state by an operation of the power tool by the user.

When a power tool is to be driven, for example, in a case where a motor, which is a power source of the power tool, falls into a locked state (a rotation-stopped state) and a lock current flows through the power tool from the rechargeable battery pack, it is possible to have the motor restored to a normal state if the driving of the power tool is suspended.

Considering a case where the content of the abnormality restorable to a normal state as above is included in the plurality kinds of contents of the abnormalities detected by the abnormality detection device, the abnormality display control device may be configured as below.

Specifically, the lighting pattern of the display element may be set in such a manner that, when the abnormality display control device displays an abnormality of the rechargeable battery detected by the abnormality detection device, it can be identified whether or not a content of the abnormality is a kind in which an abnormal state can be removed by an external operation.

According to the rechargeable battery pack as above, the user can identify whether or not the abnormality occurring in the rechargeable battery can be restored to a normal state by an external operation through the lighting pattern of the display element. If the abnormality is identified as being restorable to a normal state, the rechargeable battery pack can be promptly restored to a normal state by the user.

In the rechargeable battery pack of the present invention, when an abnormality of the rechargeable battery is detected by the abnormality detection device, the abnormality display control device may perform an abnormality display in priority to a remaining capacity display performed by the remaining capacity display control device.

If the rechargeable battery pack is configured as such, it becomes possible to display an abnormality of the rechargeable battery to the user in priority to a remaining capacity of the rechargeable battery. As a result, the user can handle the rechargeable battery pack in accordance with the display of the abnormality, and safety is thereby improved.

BRIEF DESCRIPTION OF THE DRAWINGS

Preferred embodiments of the present invention will be described below with reference to the accompanying drawings, in which:

FIG. 4 is a flowchart showing a display control processing executed by an MCU in the rechargeable battery pack; and FIG. 5 is an explanatory diagram explaining lighting patterns of display elements at the time of displaying a remaining capacity and an abnormality of the rechargeable battery.

DETAILED DESCRIPTION OF THE PREFERRED EMBODIMENTS

[Structure of the Entire Power Tool]

Figure 1:
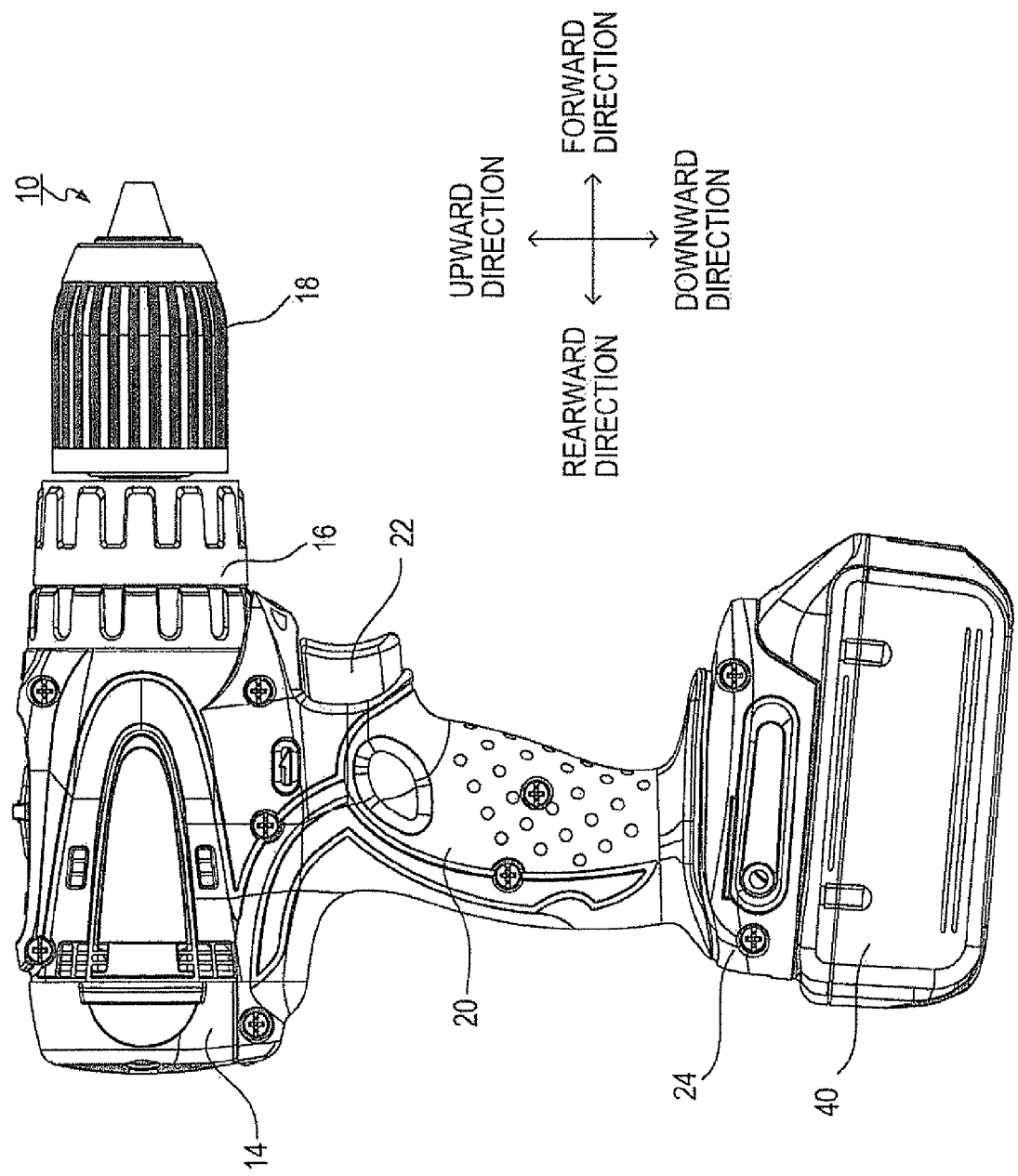
FIG. 1 is a side view showing an entire structure of a power tool to which a rechargeable battery pack of the embodiment is attached.

As shown in FIG. 1, a power tool of the present embodiment includes a power tool body (hereinafter referred to simply as "a body") 10 and a rechargeable battery pack 40.

The body 10 is constituted as a so-called driver drill. The rechargeable battery pack 40 is detachably attached to the body 10 to supply a direct current (DC) power source to the body 10.

The body 10 includes a motor housing 14, a gear housing 16 located in front of the motor housing 14, a drill chuck 18 located in front of the gear housing 16, and a handgrip 20 located below the motor housing 14.

The motor housing 14 contains a drive motor M1 (see FIG. 3) generating a driving force that rotary-drives the drill chuck 18.

The gear housing 16 contains a gear mechanism (not shown) that transmits the driving force of the drive motor M1 to the drill chuck 18.

The drill chuck 18 includes an attachment mechanism (not shown) that detachably attaches a tool bit (not shown) at a front end of the drill chuck 18.

The handgrip 20 is shaped so that a user of the power tool can grasp the handgrip 20 with one hand. On an upper front of the handgrip 20, a trigger switch 22 is provided for the user of the power tool to drive/stop the drive motor M1.

Further, on a lower end of the handgrip 20, a rechargeable battery pack attachment portion 24 for detachably attaching the rechargeable battery pack 40 to the body 10 is provided. The rechargeable battery pack attachment portion 24 is so configured that the user of the power tool can detach the rechargeable battery pack 40 from the rechargeable battery pack attachment portion 24 by sliding the rechargeable battery pack 40 toward a front of the body 10.

Figure 2:
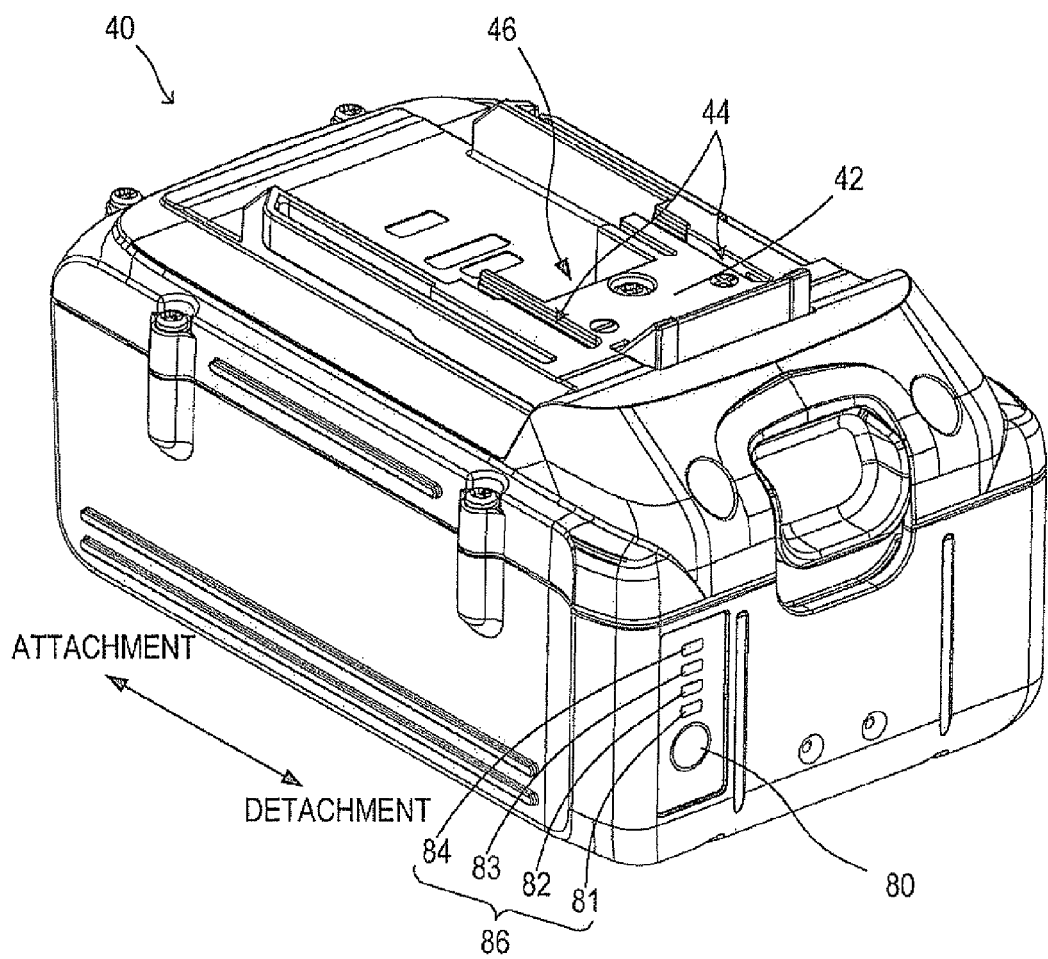
FIG. 2 is a perspective view showing an appearance of the rechargeable battery pack.

As shown in FIG. 2, a connector portion 42 for connecting to the rechargeable battery pack attachment portion 24 of the body 10 or to a battery charger (not shown) is formed on an upper part of the rechargeable battery pack 40. Further, on the connector portion 42, a power-supply terminal portion 44 and a connection terminal portion 46 are provided. The power-supply terminal portion 44 and the connection terminal portion 46 are provided to electrically connect the rechargeable battery pack 40 to the rechargeable battery pack attachment portion 24 of the body 10 or to the battery charger.

The rechargeable battery pack 40 is constituted by housing a rechargeable battery 50 (see FIG. 3), which can be charged/discharged via the connector portion 42, in a casing. Formed on the casing is the connector portion 42 for attaching to the rechargeable battery pack attachment portion 24 of the body 10 or a rechargeable battery pack attachment portion of the not-shown battery charger (see FIG. 2).

The rechargeable battery pack 40 is electrically connected to an internal circuit of the body 10 via the power-supply terminal portion 44 and the connection terminal portion 46 provided on the connector portion 42 by being attached to the body 10 via the connector portion 42. As a result, the rechargeable battery pack 40 can supply the DC power to the body 10 (see FIG. 3).

Similarly, the rechargeable battery pack 40 is electrically connected to a charging circuit of the battery charger via the power-supply terminal portion 44 and the connection terminal portion 46 by being attached to the not-shown battery charger via the connector portion 42. As a result, the rechargeable battery 50 can be charged by the battery charger.

As shown in FIG. 2, a display unit 86 for displaying a remaining capacity and an abnormality of the rechargeable battery 50 is provided on a surface different from that including the connector portion 42 of the casing of the rechargeable battery pack 40 (namely, a rear end surface facing rearward of the body 10 when the rechargeable battery pack 40 is attached to the body 10, in the present embodiment).

The display unit 86 is constituted by arranging four display elements 81, 82, 83 and 84, which are formed by LEDs, in a row. Provided on one end of the display unit 86 in an arrangement direction is a display switch 80 for providing the display unit 86 with a command to display a remaining capacity or an abnormal state.

[Circuit Configuration of the Power Tool Body 10]

Figure 3:
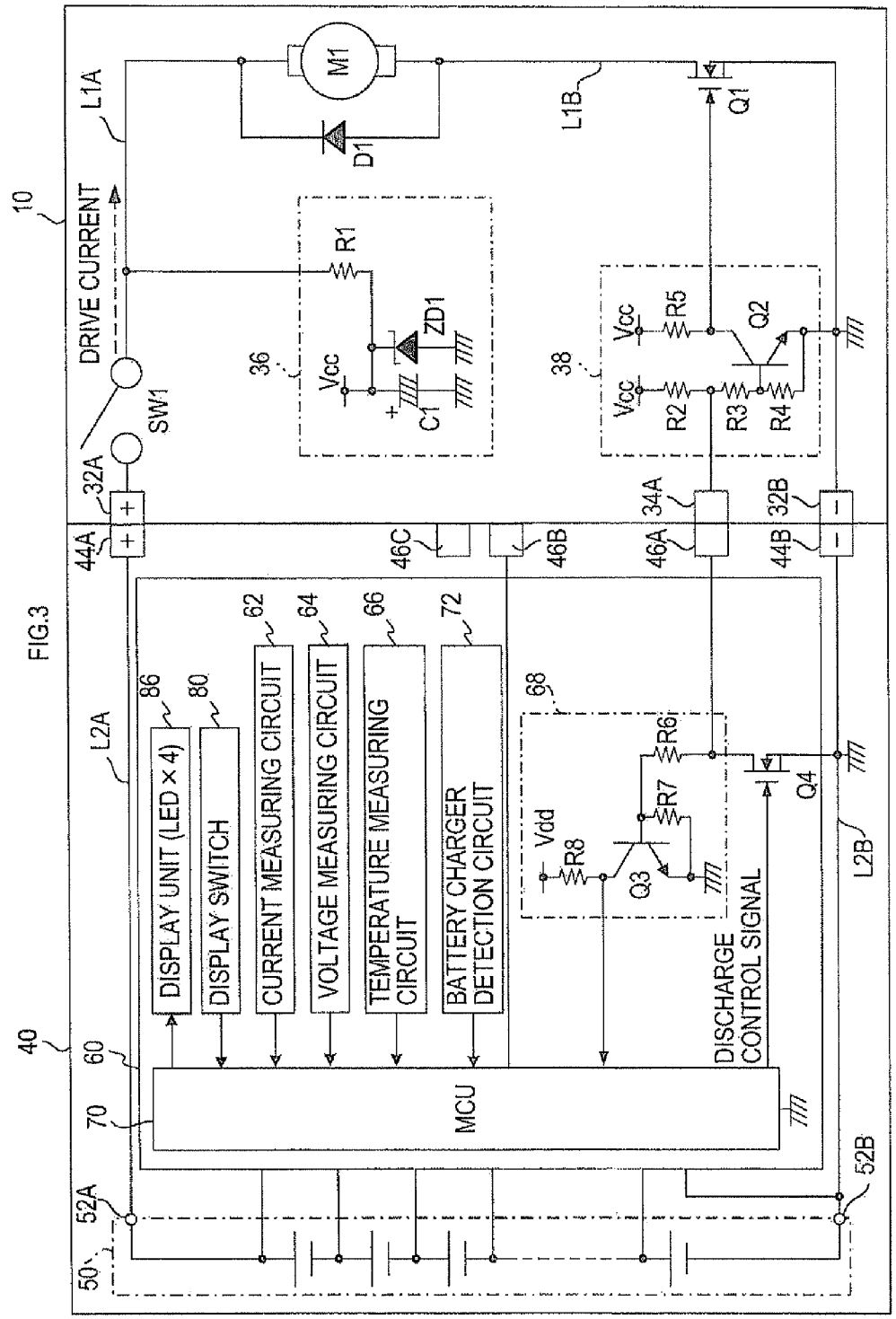
FIG. 3 is a circuit diagram showing a circuit configuration of the entire power tool including the rechargeable battery pack.

FIG. 3 is a circuit diagram showing a circuit for controlling the drive motor M1. The circuit is formed of the rechargeable battery pack 40 and the body 10 when the rechargeable battery pack 40 is attached to the body 10.

As shown in FIG. 3, the body 10 includes a positive side terminal 32A, a negative side terminal 32B, and a signal terminal 34A. The positive side terminal 32A and the negative side terminal 3213 are terminals for connecting to the power-supply terminal portion 44 of the rechargeable battery pack 40. The signal terminal 34A is a terminal for connecting to the connection terminal portion 46 of the rechargeable battery pack 40.

The positive side terminal 32A is connected to one end of the drive motor M1 via a main switch SW1 and a positive side power-supply line L1A. The negative side terminal 328 is connected to the other end of the drive motor M1 via a transistor Q1 for controlling energization to the drive motor M1 and a negative side power-supply line L1B.

In the present embodiment, the drive motor M1 is constituted by a direct current motor with a brush. The drive motor M1 is energized to rotate by the transistor Q1 being turned on by an input signal from the rechargeable battery pack 40 when the main switch SW1 is in an on-state.

A diode D1 is connected to the drive motor M1. The diode D1 is a diode (so-called a flywheel diode) for returning a high voltage generated in the negative side power-supply line L1B when the transistor Q1 is in a turned-off state to the positive side power-supply line L1A.

The main switch SW1 is switched between an on-state and an off-state in conjunction with the above-described trigger switch 22. When the trigger switch 22 is depressed, the main switch SW1 is turned on, and, when the trigger switch 22 is released, the main switch SW1 is turned off.

For the transistor Q1, an N-channel MOSFET is used.

Further, the body 10 includes a control power-supply circuit 36 and an input/output circuit 38. The control power-supply circuit 36 generates a power-supply voltage for driving the internal circuit. The input/output circuit 38 inputs/outputs a signal from/to the rechargeable battery pack 40.

The control power-supply circuit 36 includes a zener diode ZD1 and a capacitor C1. A cathode of the zener diode ZD1 is connected to the positive side power-supply line L1A via a resistor R1. An anode of the zener diode ZD1 is grounded to a ground of the body 10.

The capacitor C1 is constituted by an electrolytic capacitor. A positive side of the capacitor C1 is connected to the positive side power-supply line L1A via the resistor R1 together with the cathode of the zener diode ZD1. A negative side of the capacitor C1 is grounded to the ground of the body 10.

To the ground of the body 10, the negative side terminal 32B is connected. When the rechargeable battery pack 40 is attached to the body 10, a negative side of the body 10 is connected to a negative side power-supply line L2B of the rechargeable battery pack 40 (and then, to a negative side terminal 52B of the rechargeable battery 50) via the negative side terminal 32B.

When the main switch SW1 is in an on-state, the positive side power-supply line L1A is connected to the positive side power-supply line L2A (and then, to the positive side terminal 52A of the rechargeable battery 50) via the positive side terminal 32A.

Accordingly, in the control power-supply circuit 36, when the main switch SW1 is in a turned-on state, a battery voltage (e.g., 36V DC) of the rechargeable battery 50 is applied to the anode of the zener diode ZD1 from the positive side power-supply line L1A via the resistor R1. Then, the battery voltage of the rechargeable battery 50 is dropped to a predetermined fixed voltage (e.g., 5V DC) by the zener diode ZD1.

The capacitor C1 is charged with the dropped DC voltage. A voltage between both ends of the capacitor C1 is supplied to various internal circuits as a power-supply voltage Vcc for activating the internal circuits of the body 10.

The input/output circuit 38 includes a transistor Q2 and resistors R2, R3, R4 and R5.

The transistor Q2 is constituted by an NPN bipolar transistor. A base of the transistor Q2 is connected to the signal terminal 34A via the resistor R3 while being grounded to a ground via the resistor R4.

The power-supply voltage Vcc is applied to the signal terminal 34A via the resistor R2. The power-supply voltage Vcc is applied to a collector of the transistor Q2 via the resistor R5. The collector of the transistor Q2 is also connected to a gate of the transistor Q1. An emitter of the transistor Q2 is grounded to a ground.

Resistance values of the resistors R2, R3 and R4 are set so that, when the main switch SW1 is turned on and the power-supply voltage Vcc has reached a predetermined voltage, the transistor Q2 is turned on, and so that an electric potential level of the signal terminal 34A becomes a high level in the vicinity of the power-supply voltage Vcc.

Since the gate of the transistor Q1 is grounded to a ground via the transistor Q2 when the transistor Q2 is in an on-state, the transistor Q1 is brought into an off-state to cut off an energizing path to the drive motor M1.

When the signal terminal 34A is grounded to a ground by an internal circuit (a transistor Q4 to be described later) of the rechargeable battery pack 40, the transistor Q2 is brought into an off-state. In such a state, the power-supply voltage Vcc is applied to the gate of the transistor Q1 via the resistor R5. As a result, the transistor Q1 is brought into an on-state to form the energizing path to the drive motor M1.

Although the collector of the transistor Q2 is directly connected to the gate of the transistor Q1 in the present embodiment, the collector of the transistor Q2 may be connected to the gate of the transistor Q1 via a drive circuit for switching the transistor Q1.

[Circuit Configuration of the Rechargeable Battery Pack 40]

The rechargeable battery pack 40 includes a positive side terminal 44A and a negative side terminal 44B provided on the power-supply terminal portion 44, three signal terminals 46A, 46B and 46C provided on the connection terminal portion 46, the rechargeable battery 50, and a control circuit 60.

To the positive side terminal 44A, the positive side terminal 52A of the rechargeable battery 50 is connected via the positive side power-supply line L2A. To the negative side terminal 44B, the negative side terminal 52B of the rechargeable battery 50 is connected via the negative side power-supply line L2B.

When the rechargeable battery pack 40 is attached to the body 10, the positive side terminal 44A is connected to the positive side terminal 32A of the body 10. The negative side terminal 44B is connected to the negative side terminal 32B of the body 10. The signal terminal 46A is connected to the signal terminal 34A of the body 10.

When the rechargeable battery pack 40 is attached to the battery charger, the signal terminals 46B and 46C are connected to a connection terminal portion of the battery charger. The signal terminals 46B and 46C are in an open state when the rechargeable battery pack 40 is attached to the body 10.

The rechargeable battery 50 is constituted by connecting a plurality of (e.g., ten) rechargeable battery cells in series between the positive side terminal 52A and the negative side terminal 52B. The rechargeable battery 50 generates a drive voltage (e.g., 36V DC) for driving the drive motor M1.

The rechargeable battery cell is constituted by a lithium ion rechargeable battery that generates a DC voltage of 3.6V, for example, on a standalone basis. Therefore, the rechargeable battery 50 can achieve high output, and a discharge current that can be outputted is 10A or more, for example.

The control circuit 60 includes a current measuring circuit 62, a voltage measuring circuit 64, a temperature measuring circuit 66, a switch operation detection circuit 68, a battery charger detection circuit 72, the display switch 80 and the display unit 86 as shown in FIG. 2, a main control unit (MCU) 70, and the transistor Q4.

The current measuring circuit 62 is a circuit for detecting a current flowing through the positive side power-supply line L2A or the negative side power-supply line L2B. The current measuring circuit 62 outputs a current detection signal having a voltage value corresponding to the detected current to the MCU 70.

The voltage measuring circuit 64 measures a voltage of each of the rechargeable battery cells constituting the rechargeable battery 50 in turns, and outputs a voltage detection signal having information of a voltage value corresponding to the measured voltage to the MCU 70.

The temperature measuring circuit 66 includes a thermistor arranged around the rechargeable battery 50, and measures a rechargeable battery temperature via the thermistor to output a temperature detection signal having a voltage value corresponding to the measured temperature to the MCU 70.

The switch operation detection circuit 68 includes a transistor Q3 and resistors R6, R7 and R8. The switch operation detection circuit 68 is a circuit for detecting that the trigger switch 22 of the body 10 has been operated.

The transistor Q3 is constituted by an NPN bipolar transistor. A base of the transistor Q3 is connected to the signal terminal 46A via the resistor R6 while being grounded to a ground of the rechargeable battery pack 40 via the resistor R7. Further, an emitter of the transistor Q3 is grounded to a ground.

The ground of the rechargeable battery pack 40 is connected to the negative side power-supply line L2B. Therefore, when the rechargeable battery pack 40 is attached to the body 10, the grounds of the rechargeable battery pack 40 and the body 10 are caused to exhibit the same potential, and each of these grounds is caused to exhibit the same potential as a negative electrode of the rechargeable battery 50.

A collector of the transistor Q3 is connected to the MCU 70 while being connected via the resistor R8 to an output path of the power-supply voltage Vdd (e.g., 5V DC) from a control power-supply circuit (not shown) provided on the rechargeable battery pack 40.

The control power-supply circuit is a circuit that receives power supply from the rechargeable battery 50 to generate the fixed power-supply voltage Vdd, and supplies power to various electronic circuits in the rechargeable battery pack 40. The control power-supply circuit is constituted by a switching power-supply circuit or the like, for example.

The transistor Q4 is constituted by an N-channel MOSFET. A drain of the transistor Q4 is connected to the signal terminal 46A, to which the base of the transistor Q3 is connected via the resistor R6. Further, a source of the transistor Q4 is grounded to a ground, and a gate of the transistor Q4 is connected to the MCU 70.

Due to such a configuration, the transistor Q4 is turned on/off by an output signal (a discharge control signal to be described later) from the MCU 70. When the transistor Q4 is in an off-state, the signal terminal 46A is in an open state.

Accordingly, when the rechargeable battery pack 40 is attached to the body 10 and the trigger switch 22 is operated (the main switch SW1: on), a high level signal corresponding to the power-supply voltage Ycc in the body 10 is inputted from the signal terminal 34A of the body 10 to the signal terminal 46A of the rechargeable battery pack 40 if the transistor Q4 is in an off-state. Due to this, the transistor Q3 in the switch operation detection circuit 68 is brought into an on-state, and an input signal from the switch operation detection circuit 68 to the MCU 70 becomes low level.

Even when the rechargeable battery pack 40 is attached to the body 10, if the trigger switch 22 is not operated (the main switch SW1: off), the signal terminal 34A of the body 10 becomes low level (ground potential). In such a case, the transistor Q3 in the switch operation detection circuit 68 is brought into an off-state, and the input signal from the switch operation detection circuit 68 to the MCU 70 becomes high level.

The battery charger detection circuit 72 is a circuit that provides a detection signal to the MCU 70. The detection signal is a signal that, when the rechargeable battery pack 40 is attached to the battery charger and the high level signal (e.g., 5V DC) is inputted from the battery charger to the signal terminal 46C, indicates accordingly. The battery charger detection circuit 72 is constituted in the same manner as with the switch operation detection circuit 68.

In other words, the battery charger detection circuit 72 inputs the high level signal corresponding to the power-supply voltage Vdd to the MCU 70 via a pull-up resistor when the signal terminal 46C is in an open state. On the other hand, when the high level signal is inputted from the battery charger to the signal terminal 46C, a transistor connected to a signal path to the MCU 70 is brought into an on-state, thereby to ground the signal path to a ground and to make an output to the MCU 70 low level.

Due to such a configuration, the MCU 70 can detect that the trigger switch 22 has been operated on the body 10, to which the rechargeable battery pack 40 is attached, based on the input signal from the switch operation detection circuit 68. Further, the MCU 70 can detect that the rechargeable battery pack 40 has been attached to the battery charger based on the input signal from the battery charger detection circuit 72.

The MCU 70 is constituted by a known microcomputer composed of a CPU, a ROM, a RAM, a rewritable nonvolatile memory, an input/output (I/O) port, an A/D converter, and the like. The MCU 70 executes various control processings for charging/discharging the rechargeable battery 50 and for displaying a state of the rechargeable battery 50 based on the input signal from the battery charger detection circuit 72.

[Display Control by the MCU 70]

Among the various control processings executed by the MCU 70 in the rechargeable battery pack 40, a display control processing executed to display a remaining capacity and an abnormality of the rechargeable battery 50 is to be explained with reference to a flowchart shown in FIG. 4.

The display control processing is repeatedly executed as one of main routines in the MCU 70. When starting the display control processing, the MCU 70 firstly executes a remaining capacity calculation processing in S110. The remaining capacity calculation processing is a processing that calculates a remaining capacity of the rechargeable battery 50 based on the detection signals from the current measuring circuit 62 and the voltage measuring circuit 64 (in other words, based on a current that flowed through the rechargeable battery 50 and a rechargeable battery voltage).

In subsequent S120, abnormality determinations of the rechargeable battery 50 as shown in the following (1)-(5) are carried out based on the detection signals from the current measuring circuit 62, the voltage measuring circuit 64, and the temperature measuring circuit 66.

(1) "Lock current determination" that determines whether or not a discharge current measured by the current measuring circuit 62 has reached a lock current that flows when the drive motor M1 is locked.

(2) "Overdischarge determination" that determines whether or not the rechargeable battery voltage measured by the voltage measuring circuit 64 has been dropped below a preset threshold value for determining overdischarge.

(3) "Overload determination" that determines whether or not an integrated value of the discharge current measured by the current measuring circuit 62 has exceeded a threshold value for determining overload.

(4) "High-temperature determination" that determines whether or not the rechargeable battery temperature measured by the temperature measuring circuit 66 has exceeded a preset threshold value for determining high temperature.

(5) "Failure determination" that determines whether or not the rechargeable battery 50 is in a failed state based on whether or not the rechargeable battery voltage measured by the voltage measuring circuit 64 is outside a normal range or the like.

Here, as exemplified in FIG. 5, a priority level for displaying a determination result and a lighting pattern of the display elements 81-84 corresponding to the determination result are set in advance for each of the results of the above five abnormality determinations.

An abnormality display associated with the "lock current determination" has the lowest display priority (priority level: 1). A display pattern of the "lock current determination" is so set as to blink the two display elements 81 and 82 at short intervals (quick blinking).

An abnormality display associated with the "failure determination" has the highest display priority (priority level: 3). A display pattern of the "failure determination" is so set as to blink the four display elements 81-84 at intervals longer than those in the "lock current determination" (slow blinking).

The display priority of an abnormality display associated with the "overdischarge determination", the "overload determination", and the "high-temperature determination" is set to a value intermediate between those of the "lock current determination" and the "failure determination" (priority level: 2).

A display pattern of the "overdischarge determination" is so set as to blink the single display element 81 slowly at the same intervals as in the "failure determination". A display pattern of the "overload determination" is so set as to blink the two display elements 81 and 82 slowly at the same intervals as in the "failure determination". A display pattern of the "high-temperature determination" is so set as to blink the three display elements 81-83 slowly at the same intervals as in the "failure determination".

The display elements in an abnormality display associated with the "lock current determination" are blinked at different intervals from the abnormality displays associated with the other abnormality determinations. This is because, when the drive motor M1 falls into a locked state, the user can remove the locked state of the drive motor M1 by stopping operating the trigger switch 22, which is used as an operation switch to turn off the main switch SW1.

In other words, when the above-described abnormality determinations are made, the MCU 70 makes the discharge control signal low level and turns off the transistor Q4 in order to protect the rechargeable battery 50. As a result, the transistor Q2 of the body 10 is brought into an on-state and the transistor Q1 of the body 10 is brought into an off-state, thereby to stop discharge from the rechargeable battery 50 to the drive motor M1 (hereinafter also referred to as a protection operation).

When such a protection operation is performed based on the "overdischarge determination", the "overload determination", the "high-temperature determination", or the "failure determination", it is impossible to promptly restore the rechargeable battery 50 to a normal state while the rechargeable battery pack 40 is attached to the body 10. Therefore, the determination result that the rechargeable battery 50 is in an abnormal state is to be stored in a memory in the MCU 70 until the rechargeable battery pack 40 is detached from the body 10 and attached to the battery charger. In such a case, the abnormal state cannot be removed.

However, in the case of the abnormality of the "lock current determination", the user can promptly restore the rechargeable battery 50 to a normal state by stopping operating the trigger switch 22 to remove the locked state of the drive motor M1. Therefore, although the MCU 70 stops discharge from the rechargeable battery 50 to the drive motor M1 in order to protect the rechargeable battery 50 when the "lock current determination" is made, the MCU 70 terminates such a protection operation when the main switch SW1 is turned off subsequently.

Accordingly, in the present embodiment, the blinking intervals at the time of displaying an abnormality are set differently between the "lock current determination", in which the rechargeable battery 50 can be promptly restored to a normal state by the switch operation by the user as above, and the other abnormality determinations. Due to such a setting, it becomes possible for the user to detect the promptly-recoverable abnormality more easily through the blinking intervals.

Further, lighting patterns of the display elements 81-84 at the time of displaying a remaining capacity of the rechargeable battery 50 are also set in advance as shown in FIG. 5.

Specifically, the lighting patterns are set as follows. When a remaining capacity of the rechargeable battery 50 is "0-25%", one display element (the display element 81) is to be lighted. When a remaining capacity of the rechargeable battery 50 is "25%-50%", two display elements (the display elements 81 and 82) are to be lighted. When a remaining capacity of the rechargeable battery 50 is "50%-75%", three display elements (the display elements 81-83) are to be lighted. When a remaining capacity of the rechargeable battery 50 is "75%-100%", all display elements (the display elements 81-84) are to be lighted.

Subsequently, when the abnormality determinations of the rechargeable battery 50 are completed in S120, the process then proceeds to S130 to determine whether or not an abnormality of the rechargeable battery 50 has been detected in S120.

Then, if it is determined in S130 that no abnormality of the rechargeable battery 50 has been detected in S120, the process proceeds to S140 to determine whether or not the display switch 80 provided on the rechargeable battery pack 40 has been operated (depressed) by the user.

If it is determined in S140 that the display switch 80 has not been operated (depressed), the display control processing is terminated. Conversely, if it is determined in S140 that the display switch 80 has been operated (depressed), the process proceeds to S150.

In S150, a lighting pattern of the display unit 86 corresponding to a remaining capacity of the rechargeable battery 50 is set based on the remaining capacity of the rechargeable battery 50 calculated in S110 and the data showing the lighting patterns of the display elements 81-84 as shown in FIG. 5. Further in S150, a remaining capacity display time period (e.g., three seconds) preset as a time period for lighting the display unit 86 in the above lighting pattern is set. Then, the process proceeds to S160.

Conversely, if it is determined in S130 that an abnormality of the rechargeable battery 50 has been detected in S120, the process proceeds to S170 to determine whether or not the display unit 86 is currently in a display state.

If it is determined in S170 that the display unit 86 is currently in a display state, the process proceeds to S210 to determine whether or not the display priority of a content of the currently detected abnormality (priority level of the detected abnormality) is higher than the display priority of the current display (priority level of the displayed content).

If it is determined in S210 that the display priority of the content of the currently detected abnormality is higher than the display priority of the current display, the process proceeds to S200. Conversely, if it is determined in S210 that the display priority of the content of the currently detected abnormality is the same as or lower than the display priority of the current display, the display control processing is terminated.

Subsequently, if it is determined in S170 that the display unit 86 is currently not in a display state, the process proceeds to S180 to determine whether or not the display switch 80 provided on the rechargeable battery pack 40 has been operated (depressed) by the user.

If it is determined in S180 that the display switch 80 has not been operated (depressed), the process proceeds to S190. Conversely, if it is determined in S180 that the display switch 80 has been operated (depressed), the process proceeds to S200.

In S190, it is determined whether or not the trigger switch 22 has been operated on the body 10, to which the rechargeable battery pack 40 is attached, to switch the main switch SW1 of the body 10 from an off-state to an on-state.

Then, if it is determined in S190 that the main switch SW1 of the body 10 has not been switched from an off-state to an on-state, the display control processing is terminated. Conversely, if it is determined in S190 that the main switch SW1 of the body 10 has been switched from an off-state to an on-state, the process proceeds to S200.

In S200, a lighting pattern of the display unit 86 corresponding to a content of an abnormality of the rechargeable battery 50 is set based on the content of the abnormality of the rechargeable battery 50 detected this time in S120 and the data showing the lighting patterns of the display elements 81-84 shown in FIG. 5. Further in S200, an abnormality display time period (e.g., ten seconds) preset as a time period for lighting the display unit 86 in the above lighting pattern is set. Then, the process proceeds to S160.

In S160, a lighting processing of the display elements 81-84 is initiated. The lighting processing of the display elements 81-84 refers to a processing of displaying the remaining capacity or the abnormality of the rechargeable battery 50 by lighting or blinking any or all of the display elements 81-84 during a lighting time period based on the lighting pattern and the lighting time period of the display unit 86 set in S150 or S200. Subsequently, the display control processing is terminated.

[Effects of the Embodiment]

As explained above, the rechargeable battery pack 40 of the present embodiment is provided with the display unit 86 for displaying a remaining capacity and an abnormality of the rechargeable battery 50 and the display switch 80 at a rear end surface facing rearward of the body 10 when the rechargeable battery pack 40 is attached to the body 10.

When the display switch 80 is operated (depressed), the MCU 70 incorporated in the rechargeable battery pack 40 displays a remaining capacity of the rechargeable battery 50 by controlling the number of the lighted display elements 81-84 that constitute the display unit 86.

Further, the MCU 70 is configured to detect not only a remaining capacity of the rechargeable battery 50 but also various abnormalities of the rechargeable battery 50. If the display switch 80 is operated (depressed) or the trigger switch 22 of the body 10 is operated while an abnormal state of the rechargeable battery 50 is being detected, the MCU 70 displays a content of the detected abnormality in priority to the remaining capacity by using the four display elements 81-84 that constitute the display unit 86.

Therefore, according to the rechargeable battery pack 40 of the present embodiment, it is possible to display an abnormality of the rechargeable battery 50 by means of the rechargeable battery pack 40 on a standalone basis without being provided with a display device exclusively for displaying an abnormality (i.e., without causing upsizing of the rechargeable battery pack 40).

Further, the user can detect an abnormality of the rechargeable battery 50 without attaching the rechargeable battery pack 40 to the power tool body 10 or the battery charger and, therefore, a user-friendly rechargeable battery pack can be provided.

The time period for displaying a remaining capacity and an abnormal state of the rechargeable battery 50 is limited to the preset remaining capacity display time period and the preset abnormality display time period, respectively. By setting these display time periods to an appropriate time period required for the user to confirm a displayed content, electric power of the rechargeable battery 50 can be inhibited from being unnecessarily consumed.

In the present embodiment, when an abnormality of the rechargeable battery 50 is displayed, a lighting pattern is set in accordance with a content of the abnormality so that the content of the abnormality can be identified through the lighting pattern of the display elements 81-84. Moreover, when the "lock current determination" is made, in which the rechargeable battery pack 40 can be restored to a normal state without being attached to the battery charger, the lighting pattern having different blinking intervals from those of the other abnormality determinations is set.

Therefore, the user can detect the content of the abnormality of the rechargeable battery 50 through the number of the blinking display elements 81-84 and the blinking intervals thereof. Further, it becomes possible for the user to identify at a glance the content of the abnormality (a locked state of the drive motor M1) which can be promptly restored to a normal state by an operation in the body 10 (specifically, by stopping an operation of the trigger switch 22).

The correspondence relationships between the terms in the present embodiment and the terms in the present invention are shown as below.

The remaining capacity calculation processing executed in S110 of the display control processing shown in FIG. 4 corresponds to an example of a processing achieved by a function of the remaining capacity detection device of the present invention. A series of the processings in S140-S160 corresponds to an example of a processing achieved by a function of the remaining capacity display control device of the present invention. The abnormal state detection processing executed in S120 corresponds to an example of a processing achieved by a function of the abnormality detection device of the present invention. A series of the processings in S130, S170-S210 and S160 corresponds to an example of a processing achieved by a function of the abnormality display control device of the present invention and, among these, the processing in S190 corresponds to an example of a processing achieved by a function of the determination device of the present invention.

[Modified Examples]

Although one embodiment of the present invention is explained as above, the present invention is not limited to the above embodiment and can take various forms without departing from the spirit of the present invention.

In the above embodiment, for example, as to the abnormality determination of the rechargeable battery 50, it is explained that the "lock current determination", the "overdischarge determination", the "overload determination", the "high-temperature determination", and the "failure determination" are performed. However, a "rechargeable battery cell abnormality determination", an "overcharge determination", a "control circuit failure determination" and the like may be further performed. In the "rechargeable battery cell abnormality determination", an abnormality determination of each of the rechargeable battery cells constituting the rechargeable battery 50 is performed based on a voltage of each rechargeable battery cell. In Also explained in the above embodiment is the rechargeable battery pack 40 configured to display a remaining capacity and an abnormality of the rechargeable battery 50 by changing the numbers of the lighted display elements 81-84 formed by LEDs or switching the lighting patterns of the display elements 81-84. However, the rechargeable battery pack 40 of the present invention may be configured to display a remaining capacity and an abnormal state of the rechargeable battery 50 by being provided with only one display element, a color of which is changeable among colors such as red, green and blue when lighted, for example, and/or by switching the colors or the lighted states (lighted/blinking, blinking intervals, and the like) of the display element when lighted.

Further explained in the above embodiment is the case where the present invention is applied to the driver drill. However, the present invention may be applied to a power tool other than the driver drill.

What is claimed is:

1. A rechargeable battery pack attachable to a power tool, the rechargeable battery pack comprising:
    a rechargeable battery;
    a display element provided in such a manner that a lighted state thereof can be confirmed from outside;
    a remaining capacity detection device that detects a remaining capacity of the rechargeable battery;
    a remaining capacity display control device that displays the remaining capacity detected by the remaining capacity detection device by controlling the lighted state of the display element;
    an abnormality detection device that detects an abnormality of the rechargeable battery;

a determination device that determines whether or not an operation switch of the power tool has been operated when the rechargeable batter sack is attached to the power tool; and an abnormality display control device that displays the abnormality of the rechargeable battery, even when the determination device determines that the operation switch of the power tool has been operated, detected by the abnormality detection device by controlling the lighted state of the display element to an abnormality display state, which is different from a remaining capacity display state controlled by the remaining capacity display control device.

2. The rechargeable battery pack according to claim 1, further comprising:

a display switch that inputs a display command by an external operation, wherein the remaining capacity display control device controls the lighted state of the display element in accordance with the display command from the display switch, thereby to display the remaining capacity of the rechargeable battery.

3. The rechargeable battery pack according to claim 1, further comprising:

a display switch that inputs a display command by an external operation, wherein the abnormality display control device controls the lighted state of the display element in accordance with the display command from the display switch, thereby to display the abnormality of the rechargeable battery.

4. The rechargeable battery pack according to claim 1, wherein the remaining capacity display control device continues a display of the remaining capacity of the rechargeable battery from when the display is started until when a preset time period for displaying a remaining capacity is elapsed, and terminates the display when the preset time period is elapsed.

5. The rechargeable battery pack according to claim 1, wherein the abnormality display control device continues a display of the abnormality of the rechargeable battery from when the display is started until when a preset time period for displaying an abnormality is elapsed, and terminates the display when the preset time period is elapsed.

6. The rechargeable battery pack according to claim 1, wherein the abnormality detection device is configured to detect each of a plurality of kinds of abnormalities occurring in the rechargeable battery, and wherein the abnormality display control device displays the abnormality of the rechargeable battery in such a manner that a content of the abnormality can be identified by setting a lighting pattern of the display element in accordance with the content of the abnormality detected by the abnormality detection device.

7. The rechargeable battery pack according to claim 6, wherein the abnormality display control device sets the lighting pattern of the display element in such a manner that it can be identified whether or not the content of the abnormality detected by the abnormality detection device is a kind in which an abnormal state can be removed by an external operation.

8. The rechargeable battery pack according to claim 1, wherein, when the abnormality of the rechargeable battery is detected by the abnormality detection device, the abnormality display control device performs an abnormality display in priority to a remaining capacity display performed by the remaining capacity display control device.

* * * * *